United States Patent [19]

Jones

[11] Patent Number: 5,309,280
[45] Date of Patent: May 3, 1994

[54] STEREOGRAPHIC BOOK

[76] Inventor: Charles W. Jones, 630 N. College Ave, Studio 410, Indianapolis, Ind. 46204

[21] Appl. No.: 907,785

[22] Filed: Jul. 1, 1992

[51] Int. Cl.$^5$ .............................................. G02B 27/22
[52] U.S. Cl. ..................................... 359/474; 359/467
[58] Field of Search ........................ 359/474, 466, 467

[56] References Cited

U.S. PATENT DOCUMENTS

| | | | |
|---|---|---|---|
| 2,334,483 | 11/1943 | Dennis | 359/474 X |
| 2,616,333 | 11/1952 | Tinker | 359/474 X |
| 2,683,391 | 7/1954 | Nichols | 359/474 X |
| 4,549,785 | 10/1985 | Vitrac | 359/474 |
| 4,846,553 | 7/1989 | Rice | 359/474 |

*Primary Examiner*—Scott J. Sugarman
*Attorney, Agent, or Firm*—Barnes & Thornburg

[57] ABSTRACT

A stereographic book includes a case having a bottom shell. The bottom shell includes a bottom surface, a front side wall, and a rear side wall. The case also includes a top shell pivotably coupled to the bottom shell adjacent the rear side wall of the bottom shell. The stereographic book also includes an optical viewer pivotably coupled to the bottom shell adjacent the front side wall. The optical viewer includes a lens system. The stereographic book further includes a plurality of pages including a first surface having imagery thereon. The pages are pivotably coupled to the bottom shell adjacent the rear side wall spaced apart from the optical viewer by a predetermined distance. Therefore, a user can pivot the pages relative to the bottom shell and view the imagery through lens system of the optical viewer. The lens system of the optical viewer has a predetermined focal length substantially equal to the predetermined distance between the pages and the optical viewer.

20 Claims, 4 Drawing Sheets

STEREOGRAPHIC BOOK

BACKGROUND AND SUMMARY OF THE INVENTION

The present invention relates to a durable, compact, collapsible and articulated apparatus which permits multiple pages of stereographic visual images to be arranged and reviewed sequentially in conjunction with multiple pages of textual information in a manner similar and related to a book.

Stereoscopic optical viewers are well-known. A stereoscope is an optical instrument having two lenses and designed to view stereographic images so that an observer sees a 3-D image through the stereoscope. Recent developments in computer imaging and high resolution digital printing have greatly improved the ability to provide sophisticated graphics at a relatively inexpensive price.

The present invention is designed to take advantage of the high-tech synthesizing power of computer imaging as well as high resolution digital printing to provide an affordable, accessible stereographic book that is capable of communicating complex three-dimensional visual concepts which are accompanied and augmented with textual information. Because of its ability to store and convey both stereographic imagery and readable text, the present invention can be utilized extensively for educational and entertainment purposes. In particular, the present invention is useful for visual novels and children's books, including reading primers, and also as an affordable, take-home visualization tool and study aid in the fields of chemistry, molecular biology, medicine, architecture, artistic sculpture, and other areas which benefit from seeing and understanding complex three-dimensional imagery.

The stereographic book of the present invention includes 3-D stereo visual images printed on a plurality of pages, a pivotal axis for said pages, and an optical viewer including two optical lenses or other type lens system. For the purposes of this application, the term "optical viewer" refers to a device, which by its spacial shape and ergonomic design, fits the human face as to enable the individual to look through an optical lens system and see imagery. The optical viewer is spacially oriented relative to the pages by means of a pivotal axis so that the optical viewer is optically aligned for viewing by the reader of the said 3-D stereo visual images. Readable text is printed on an opposite side of each of the plurality of pages from the 3-D stereo visual images and thus co-exists in a sequential manner with the 3-D stereo visual imagery. A durable plastic case is capable of opening and snapping shut by flexible lip tabs integrated into and with its spacial shape and design.

The plastic case provides protection for the optical viewer and the pages contained within the case. The plastic case enables the optical viewer and the pages stored within the case to be deployed and redeployed in an efficient, durable, reusable and compact manner. The plastic case includes an integral crease hinged pivotal axis for the optical viewer. The optical viewer, by the integrated means of its spacial shape and ergonomic design, is merged with and formed in one piece with the plastic case. Two clear plastic optical lens elements snap into the optical viewer body formed integrally with the plastic case. The printed pages are secured into the plastic case in spacial and optical alignment with the optical viewer using binder rings or other suitable fasteners that permit pivotal movement of said pages along a fixed axis of rotation.

Stereographic visual images typically include two separate, planar or two dimensional photographic, graphic, or computer generated images printed upon a flat page. The two images are spacially arranged with a focal center positioned about 2.5 inches apart. This is the average distance between the focal centers of the human eyes. When the two separate, flat, printed images are viewed with an optical viewer having two lenses and with the appropriate optical and focal properties, each eye sees a single corresponding image intended for it. The brain fuses these said images into a true three dimensional image, creating a spacial effect similar to that experienced by normal visual spacial perception in a spacial environment.

The spacial orientations, optical relationships and alignments, and pivotal axis alignments of the present invention enable the compact and durable coexistence of a plurality of printed stereographic visual images and substantial bodies of readable text, printed and oriented on the opposite sides of the stereographic visual image pages. The spacial orientations, optical relationships and alignments and pivotal axis alignments of these said devices enables the printed and readable text to be arranged sequentially in an alternative order with the stereographic visual images, thus enabling the present invention to function in a durable, reusable, and compact format which conveys three dimensional visual images and readable text in a manner similar to a book.

According to one aspect of the present invention, a stereographic book includes a base having a first portion and a second portion. The stereographic book also includes an optical viewer pivotably coupled to the first portion of the base about a first pivot axis. The stereographic book further includes a page including a first surface having an image thereon. The page is pivotably coupled to the second portion of the base about a second pivot axis spaced apart from the first pivot axis by a predetermined distance. Therefore, a user can pivot the page relative to the base portion and view the image through lenses of the optical viewer.

According to another aspect of the invention, the optical viewer includes a lens system having a predetermined focal length substantially equal to the predetermined distance between the first pivot axis and the second pivot axis. Therefore, the image on the first surface of the page can be easily focused by a user by simply pivoting the optical viewer as the image is viewed through the lens system of the optical viewer.

According to yet another aspect of the present invention, a cover is pivotably coupled to the base. The cover is movable between an open position and a closed position. In its closed position, the cover engages the base to enclose and protect the pages and the optical viewer. The base is formed to include a flange extending around a top perimeter of the base, and the cover is formed to include at least one locking tab for engaging the flange to retain the cover in its closed position.

According to still another aspect of the present invention, the optical viewer includes first and second contoured sections configured to permit a user to pivot the optical viewer relative to the base. The optical viewer is formed to include a pair of outwardly extending ribs for protecting the lenses. The optical viewer is also formed to include a pair of indentions to permit the user to pivot the optical viewer relative to the base from a storage position substantially parallel to the base to an upright viewing position. In addition, the optical viewer is formed to include a slot for receiving a user's nose therethrough to facilitate viewing of the image through the lenses of the optical viewer.

According to a further aspect of the invention, the stereographic book includes a case including a bottom shell portion having a bottom surface, a front side wall, and a rear side wall. The case also includes a top shell pivotably coupled to the bottom shell adjacent the rear side wall of the bottom shell. The top shell is pivotable between a closed position and an open position. The top shell engages the bottom shell when the top shell is in its closed position to provide an enclosed region between the top and bottom shells.

The stereographic book also includes an optical viewer pivotably coupled to the bottom shell adjacent the front side wall. The optical viewer includes a lens system having a predetermined focal length. The optical viewer is pivotable between a storage position aligned substantially parallel to the bottom surface of the bottom shell and an upright viewing position.

The stereographic book further includes a plurality of pages. Each page includes a first surface having stereographic imagery printed thereon and a second surface having textual information printed thereon.

The stereographic book still further includes means for pivotably coupling the plurality of pages to the bottom shell adjacent the rear side wall of the bottom shell spaced apart from the optical viewer by a predetermined distance substantially equal to the predetermined focal length of the lens system. Each of the plurality of pages is pivotable relative to the bottom shell portion between an upright viewing position and a second reading position.

In the upright viewing position, the first surface of the page is aligned to face the lens system of the optical viewer so that a user can view the images through the lens system of the optical viewer to visualize a three dimensional image. In the second reading position, the pages are aligned substantially parallel to the bottom surface of the bottom shell and nested within the bottom shell.

The top shell of the case is pivotable relative to the bottom shell to its closed position to enclose and protect the plurality of pages and the optical viewer in the enclosed region between the top and bottom shells when the plurality of pages are in the second reading position and when the optical viewer is in its nested storage position.

The bottom shell includes a flange formed around a top perimeter of the bottom shell. The top shell includes an outer lip and locking tabs formed on the outer lip for engaging the flange of the bottom shell when the top shell is in its closed position to secure the plastic case in its closed position. The optical viewer includes left and right front frame sections positioned over the lenses to frame the left and right images, respectively.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
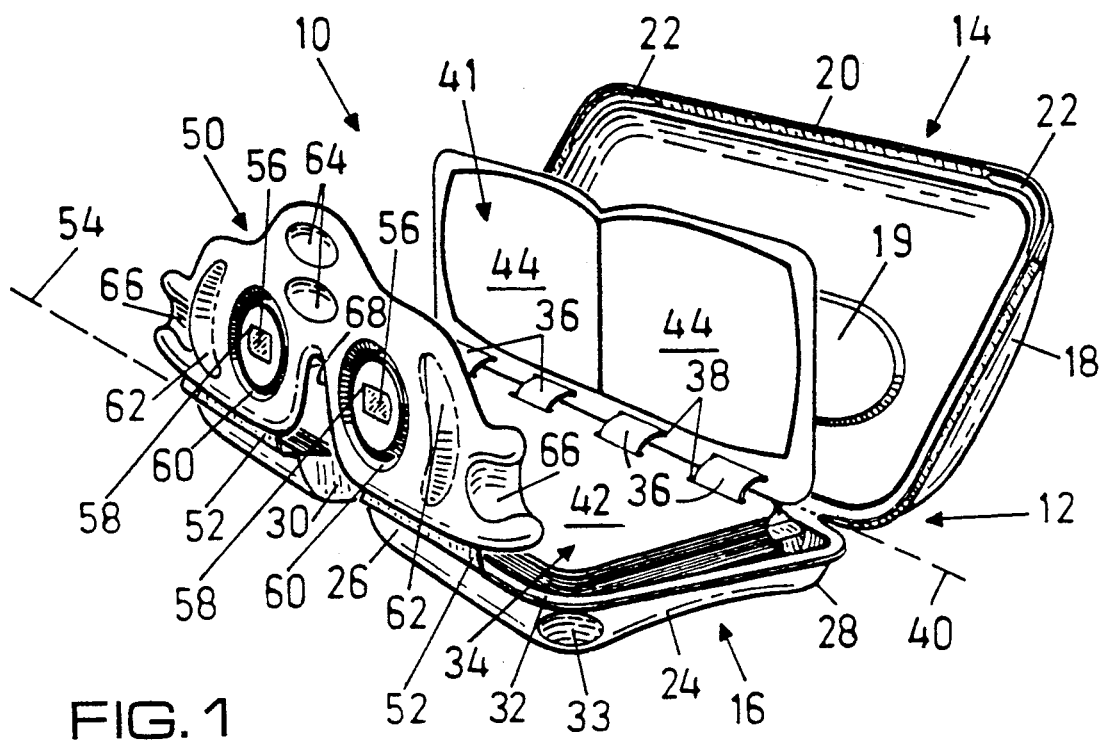
FIG. 1 is a perspective view of the stereographic book of the present invention illustrating an open case, a plurality of pages including textual and images printed thereon pivotably coupled to the case, and an optical viewer which is also pivotably coupled to the case.

Referring now to the drawings, FIG. 1 illustrates a stereographic book 10 of the present invention. Stereographic book 10 includes a plastic case 12 having a top shell portion 14 and a bottom shell portion 16. Top shell 14 is pivotably coupled to bottom shell 16 by creased hinge 17. Top shell 14 includes a convex top surface 18, and an outer rim or lip 20 having locking tabs 22 formed thereon. Top surface 18 includes a section 19 for receiving a title of the book 10. Bottom shell 16 includes a contoured bottom surface 24, a front side wall 26, and a rear side wall 28. Front side wall 26 is formed to include a notched section 30 configured to conform to the shape of a user's nose. An outer flange 32 is formed around a top perimeter or edge of bottom shell 16 to stabilize and strengthen bottom shell 16. As illustrated in detail in FIG. 3, lip 20 of top shell 14 covers flange 32 of bottom shell 16. Locking tabs 22 engage flange 32 to lock the plastic case 12 in a closed position illustrated in FIG. 2. Bottom shell 16 includes two indented regions 33 to provide an access area for a user's finger to disengage tabs 22 from flange 32 to unlock case 12.

Referring again to FIG. 1, stereographic book 10 includes a plurality of pages 34 similar to the pages of a book. Pages 34 are pivotably coupled to case 12 adjacent rear side wall 28 of bottom shell 16 by a plurality of binder clips 36 which extend through a plurality of apertures 38 formed in the plurality of pages 34. Therefore, each of the plurality of pages 34 pivots about a pivot axis 40. Each of the plurality of pages 34 includes a first surface 41 on which stereographic imagery is printed. Each of the plurality of pages 34 also includes a second surface 42 on which textual information is printed. First surface 41 includes two screens 44 for the stereographic imagery. Preferably, the images on screens 44 are produced using high resolution printing, computer imaging, or laser scanners to provide very high quality images.

Stereographic book 10 further includes an optical viewer 50 which permits a user to view images on screens 44 to provide a three-dimensional effect. Optical viewer 50 is pivotably coupled to bottom shell 16 by creased hinges 52 formed integrally with bottom shell 16. Optical viewer 50 is pivotable about a pivot axis 54 which is generally parallel to and spaced apart from the pivot axis 40 of the plurality of pates 34. Preferably, top shell 14, bottom shell 16, and optical viewer 50 are formed integrally and simultaneously from a plastic material using a vacuum forming technique. It is understood that other techniques can be used, such as injection molding. In addition, the case can be made from metal.

Optical viewer 50 includes two spaced apart lenses 56. A front frame 58 is positioned in front of each of the lenses 56 for framing for the images on screens 44. Lenses 56 are located within recessed sections 60 of viewer 50 and can be snapped into place. Elevated protecting ribs 62 are formed on optical viewer 50 to protect lenses 56 from damage. It is understood that the present invention is not limited to an optical viewer having two lenses 56. Any lens system for viewing images on screens 44 of page 41 may be used.

Optical viewer 50 is also formed to include a pair of indented sections 64 to permit the optical viewer 50 to be lifted to its upright viewing position illustrated in FIG. 1. Viewer 50 also includes contoured sections 66 which permit a user to control the angular position of viewer 50 relative to bottom shell 16 as discussed below with reference to FIG. 6. In addition, optical viewer 50 is formed to include a nose slot 68 for receiving the nose of a user therein.

Figure 2:
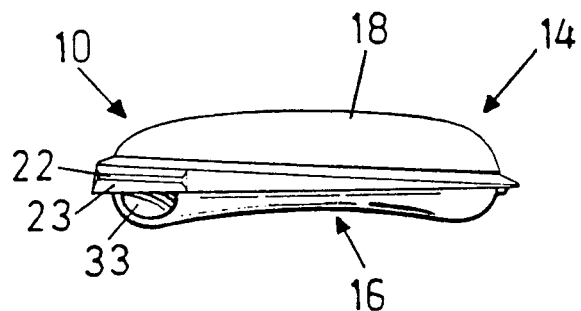
FIG. 2 is an end elevational view of the closed case.
Figure 3:
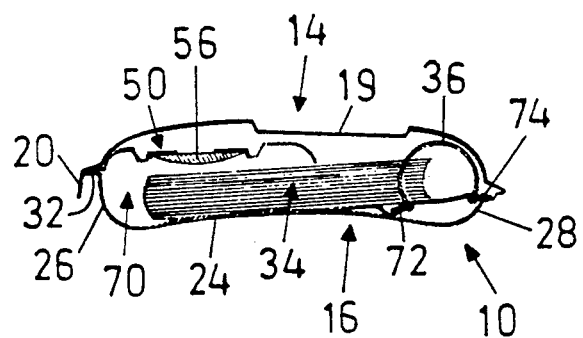
FIG. 3 is a sectional view taken through the case of FIG. 2 illustrating the optical viewer and the plurality of pages located in a nested storage position within an interior region of the closed case.

FIGS. 2 and 3 illustrate the stereographic book 10 of the present invention in its closed position for storage. In its stored position, all the pages 34 are located within an interior region 70 defined within plastic case 12. Optical viewer 50 is also pivoted about axis 54 to its storage position aligned substantially parallel to bottom surface 24 of bottom shell 16 so that top shell 14 can close over optical viewer 50 and lock to flange 32 of bottom shell 12. This provides a protective case 12 around optical viewer 50 and pages 34 to protect the components of book 10 from damage.

Figure 5:
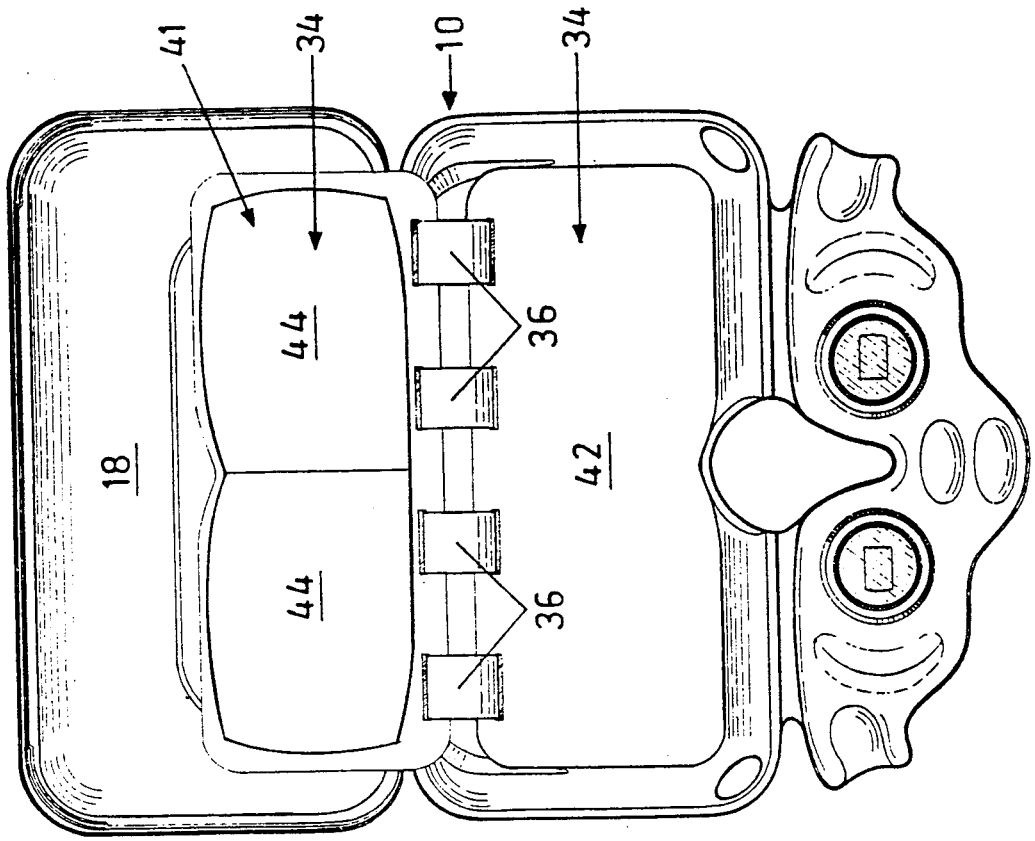
FIG. 5 is a top plan view similar to FIG. 5 in which one of the plurality of pages has been pivoted relative to the case.
Figure 4:
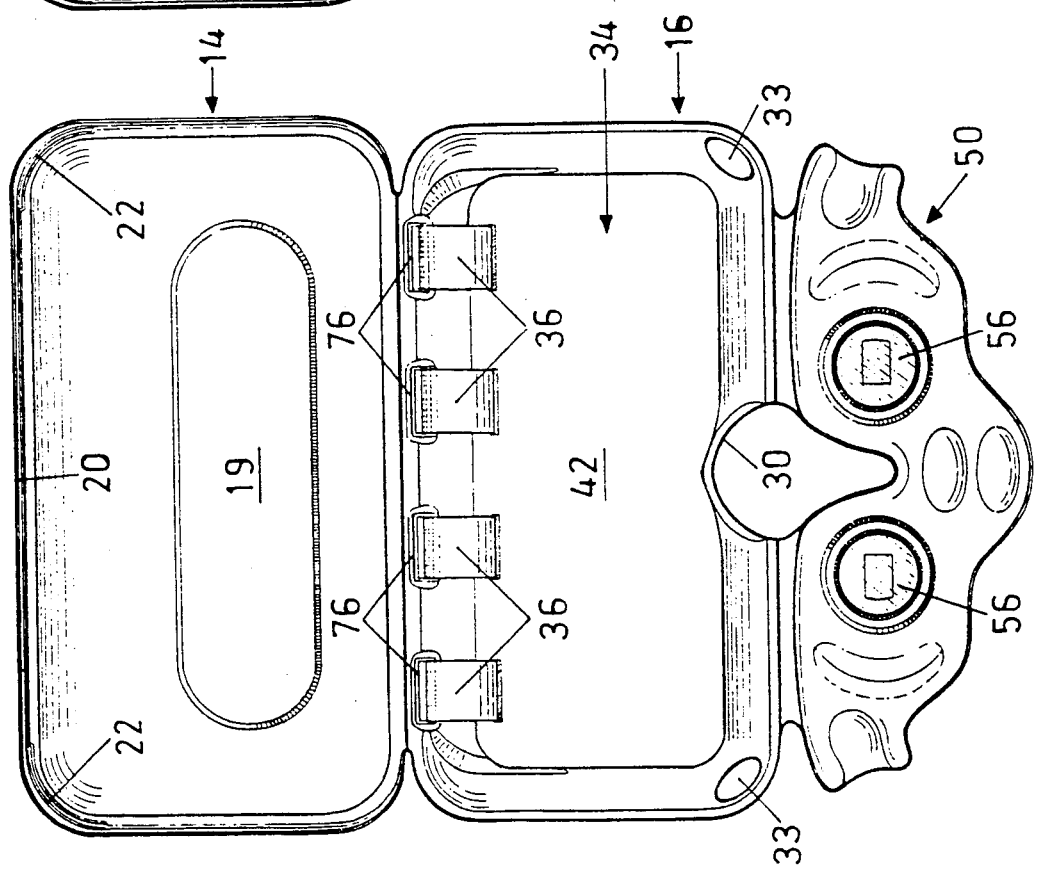
FIG. 4 is a top plan view illustrating the configuration of a top shell and a bottom shell of the case, and of the configuration of the plurality of pages coupled to the case by the plurality of binder clips.

Further details of the stereographic book 10 in its open position are illustrated in FIGS. 4 and 5. FIG. 4 illustrates the configuration of top shell 14 and bottom shell 16 with all of the plurality of pages 34 located in a reading position substantially parallel to bottom surface 24 of bottom shell 16. This position facilitates reading of the textual information on surface 42 of pages 34. FIGS. 3 and 4 illustrate how binder clips 36 are attached within the bottom shell 16. Specifically, binder clips 36 include flanges 72 and 74. Flanges 72 engage a portion of lower shell 12 as illustrated in FIG. 3. Flanges 74 extend through an aperture 76 formed in bottom shell 16 to secure binder clips 36 to bottom shell 16. FIG. 5 illustrates the configuration of the stereographic book 10 after at least one page 34 has been pivoted on binder clips 36 to reveal a stereographic imagery on screens 44.

Figure 6:
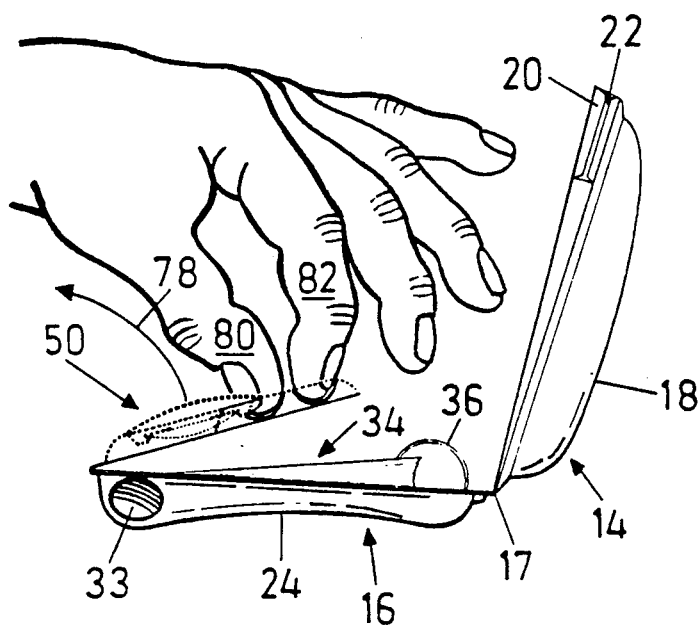
FIG. 6 is an end elevational view illustrating pivotal movement of the optical viewer of the stereographic book.

Operation of the stereographic book 10 is illustrated in FIGS. 6–9. When it is desired to use the book 10, a user pivots open top shell 14 relative to bottom shell 16 along creased hinge 17 to the position illustrated in FIG. 6. The user then grabs optical viewer 50 by lifter indentions 64 as illustrated in FIG. 6 to pivot viewer 50 relative to bottom shell 16 about pivot axis 54 in the direction of arrow 78 from its storage position illustrated in FIG. 3 to its upright viewing position illustrated in FIGS. 1, 8 and 9. Preferably, a user's thumb 80 and forefinger 82 are used to grab viewer 50 by lifter indentions 64 to pivot viewer 50 about axis 54.

Figure 7:
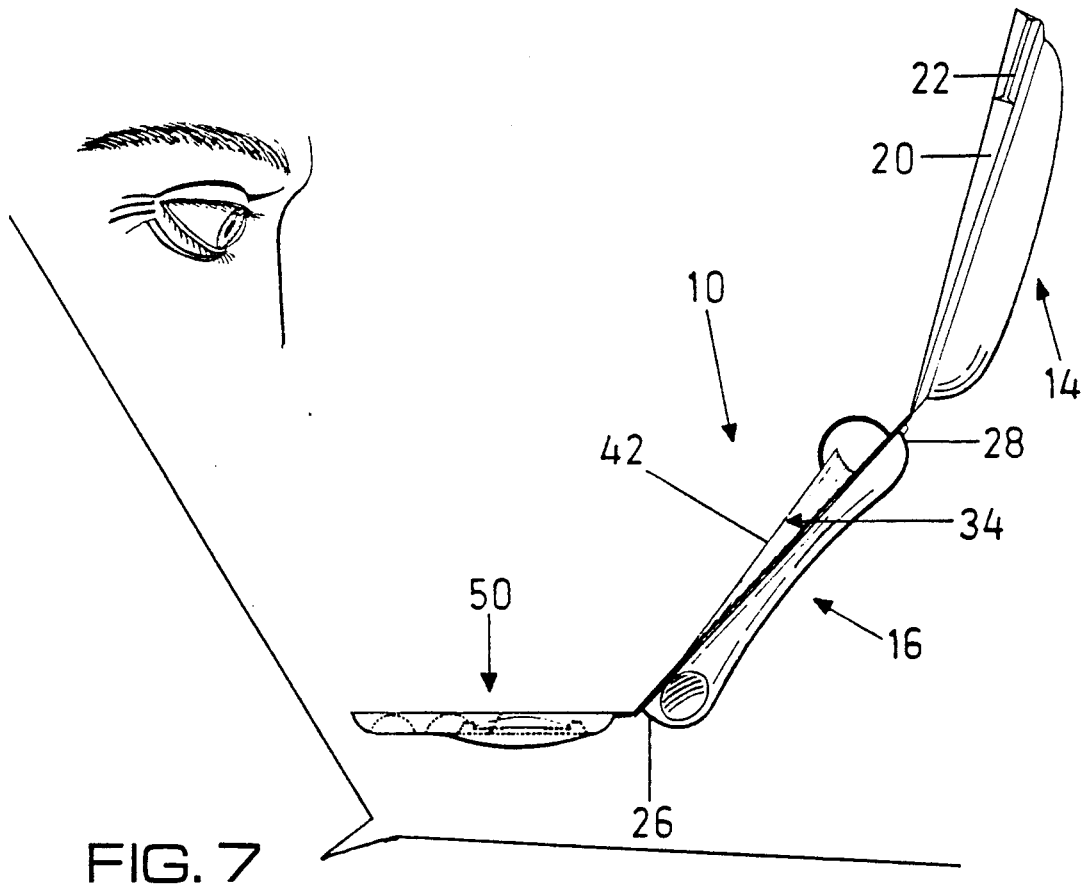
FIG. 7 is a side elevational view illustrating the position of the stereographic book for reading textual information printed on one surface of the plurality of pages.

FIG. 7 illustrates a user reading textual information located on surface 42 of pages 34. Textual material information can by any type of information including printed text copy from textbooks or children's books, or any other written media. Optical viewer 50 is not used to read the textual information on surface 42 of pages 34. As illustrated in FIG. 7, the stereographic book 10 of the present invention permits comfortable, normal reading of the textual information using the user's naked eye.

Figure 8:
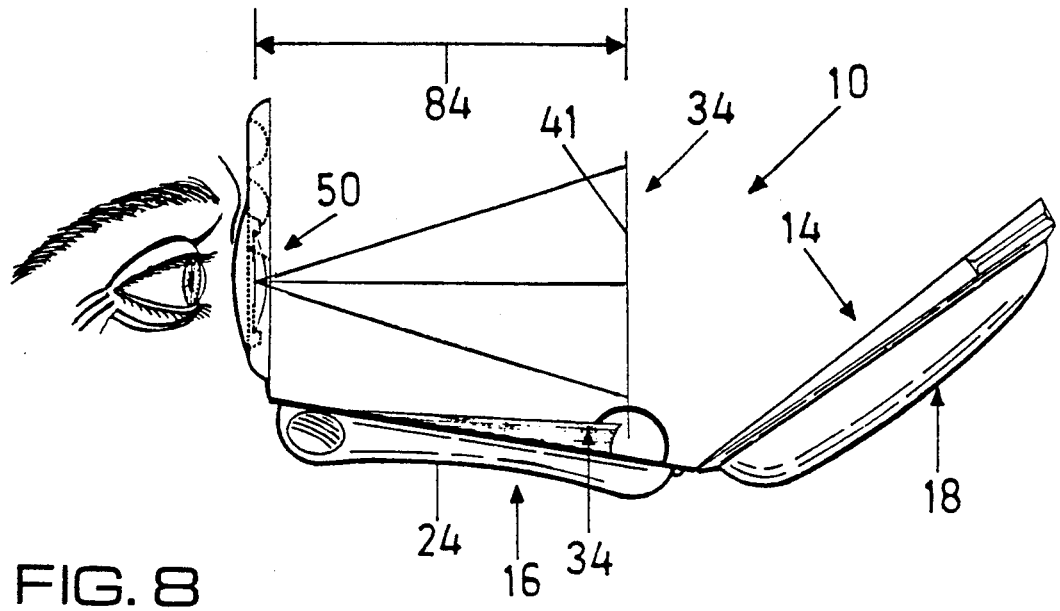
FIG. 8 is a side elevational view diagrammatically illustrating the position of an observer looking through the lens system of the optical viewer at an image printed on an opposite side of the plurality of pages from the textual information.
Figure 9:
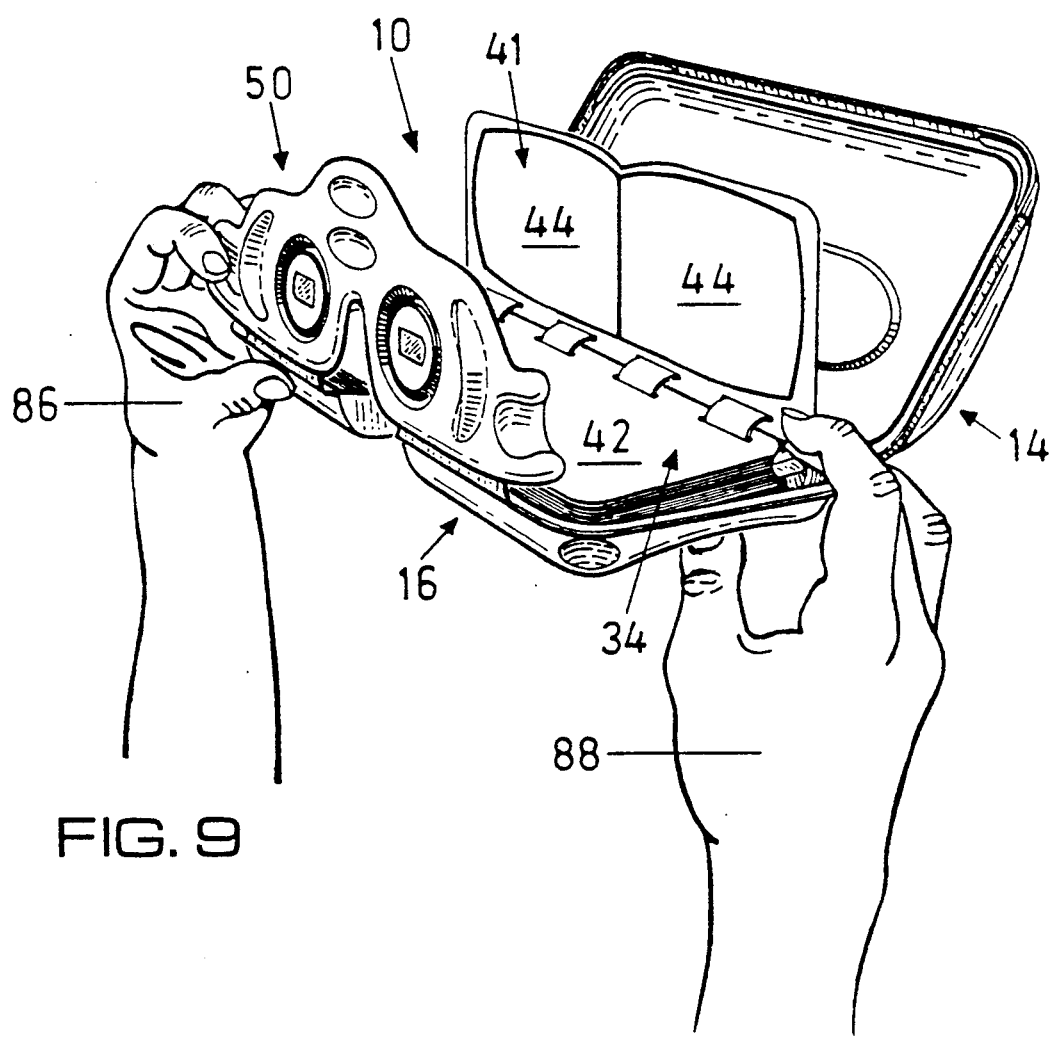
FIG. 9 is a perspective view illustrating the position of the stereographic book held within the hands of the user to facilitate viewing of the stereographic images.

After the textual information of the book located on surface 42 of page 34 is read, a user pivots the page 34 about axis 40 to an upright viewing position illustrated in FIGS. 1, 8 and 9. This displays stereographic imagery located on screens 44 on side 41 of page 34. In the upright viewing position, screens 44 of pages 34 are oriented in a direction facing optical viewer 50. As best illustrated in FIG. 8, user then looks through lenses 56 to view the stereographic images on screens 44. Such viewing permits a user to see a 3-D image.

It is understood that textual information can also be printed on surface 41 of pages 34 depending on the flow of the book. A user can read the text on page 41 without the use of optical viewer. Images, when appropriate, will always be located on surface 41, which faces viewer 50 when page 34 is in its upright viewing position.

The stereographic book 10 of the present invention provides an ergonomic design which is easy to manipulate and which advantageously provides a plurality of pages pivotably coupled to the container case 12 about a pivot axis 40 and an optical viewer 50 pivotably coupled to the case 12 about a pivot axis 54 spaced apart and generally parallel to the pivot axis 40. The distance between the axis 40 and axis 54 of optical viewer 50 is illustrated by dimension 84 in FIG. 8. Dimension 84 is preferably substantially equal to the focal length of the lenses 56. By setting dimension 84 substantially equal to the focal length of lens 56, it is easy for a user to focus the images on adjacent screens 44 by simply pivoting optical viewer 50.

FIG. 9 illustrates the preferred method for holding the stereographic book 10 of the present invention. Preferably, one hand 86 grasps optical viewer 50 between the index and middle fingers while the other hand 88 grasps bottom shell 16 and the upright page 34. It is understood that the user may switch hands so that hand 88 engages the contoured section 66 on the right side of optical viewer 50 while the left hand 86 of the user engages bottom shell 16 and upright page 34 of stereographic book 10. Therefore, by pivoting pages 34 and optical viewer 50, a user can easily focus the images after the optical viewer 50 is pivoted to its upright viewing position illustrated in FIGS. 1, 8 and 9 and the images on screens 44 of page 34 are pivoted to the upright position also illustrated in FIGS. 1, 8 and 9.

It is understood that more than one pair of stereographic images may be placed on image screens 44. Optical viewer 50 of the present invention is capable of focusing on a series of images on image screens 44 by simply pivoting the optical viewer 50 about its pivot axis 54 to change the direction of lenses 56 and by pivoting pages 34 about pivot axis 40. Therefore, the stereographic book 10 provides a substantial parallelogram configuration between optical viewer 50 and pages 34 so that by pivoting viewer 50 and pages 34 the images on surface 41 remain in focus.

The stereographic book 10 of the present invention can be made economically using vacuum form or injection molding techniques. The plurality of pages are printed in a conventional manner. However, the images on screens 44 are preferably printed using laser scanners, high resolution digital printers, or computer imaging. This improves the quality of the 3-D image seen through optical viewer 50. It is understood, however, that the present invention is not limited to images printed using these techniques.

Although the invention has been described in detail with reference to a certain illustrated embodiment, variations and modifications exist within the scope and spirit of the invention as described and defined in the following claims.

What is claimed is:

1. A stereographic book comprising:
   a base having a first portion and a second portion;
   an optical viewer formed integrally with the base, the optical viewer being pivotably coupled to the first portion of the base so that the optical viewer can pivot about a first pivot axis;
   a lens system coupled to the optical viewer;
   a plurality of pages, the pages including a first surface having an image thereon; and
   a plurality of binder clips configured to extend through a plurality of apertures formed in the plurality of pages and to engage the base for pivotably coupling the plurality of pages to the second portion of the base about a second pivot axis spaced apart from the first axis by a predetermined distance so that a user can pivot the pages relative to the base and view the image through the lens system of the optical viewer, the binder clips being removable from the base to permit the plurality of pages to be removed from the base, rearranged, and reattached to the base.

2. The book of claim 1, wherein the lens system has a predetermined focal length substantially equal to the predetermined distance between the first pivot axis and the second pivot axis.

3. The book of claim 1, further comprising a cover formed integrally with the base, the cover being movable between an open position and a closed position in which the cover engages the base to enclose and protect the plurality of pages and the optical viewer.

4. The book of claim 3, wherein the base is formed to include a flange extending around a top perimeter of the base and the cover is formed to include at least one locking tab for engaging the flange to retain the cover in its closed position.

5. The book of claim 1, wherein the plurality of pages include a second surface on an opposite side of the page from the image, the second surface having textual information printed thereon, each of the plurality of pages being pivotable relative to the base so that a user can read the textual information on the second surface of the page and then pivot the page relative to the base to permit the user to view the image through the optical viewer.

6. The book of claim 1, wherein the first surface of the page has stereographic imagery printed thereon.

7. The book of claim 6, wherein the optical viewer includes first and second front frame sections positioned over the lenses to frame the stereographic imagery.

8. The book of claim 1, wherein the optical viewer includes first and second contoured sections configured to permit a user to pivot the optical viewer relative to the base.

9. The book of claim 1, wherein the base and the optical viewer are formed simultaneously by vacuum forming a plastic material.

10. A stereographic book comprising:
    a plastic case including a bottom shell having front and rear side walls and a top shell for covering the bottom shell, the top shell being formed integrally with the rear side wall of the bottom shell;
    a plastic optical viewer formed integrally with the case, the optical viewer being pivotably coupled to the front side wall of the bottom shell of the case so that the optical viewer can pivot about a first pivot axis located adjacent the front side wall;
    a lens system coupled to the optical viewer;
    a plurality of pages including a first surface having an image thereon and a second surface having textual information thereon; and
    means for pivotably coupling the plurality of pages to the bottom shell about a second pivot axis adjacent the rear side wall, the second pivot axis being substantially parallel to and spaced apart from the first pivot axis to permit the plurality of pages to be sequentially pivoted relative to the bottom shell, thereby permitting a user to read the textual information printed on the second surfaces of the plurality of pages and then pivot the pages about the second axis of rotation to align the first surfaces of the pages to face the optical viewer so that the user can view the images on the first surfaces through the lens system of the optical viewer.

11. The book of claim 10, wherein the lens system of the optical viewer has a predetermined focal length distance substantially equal to the predetermined distance between the first pivot axis and the second pivot axis.

12. The book of claim 10, wherein the top shell is pivotably coupled to the bottom shell, the top shell being pivotable between a closed position and an open position, the top shell engaging the bottom shell when the top shell is in its closed position to provide an enclosed region between the top and bottom shells for housing the pages of the optical viewer therein.

13. The book of claim 12, wherein the bottom shell includes a flange formed around a top perimeter of the bottom shell and the top shell includes an outer lip and locking tabs formed on the outer lip for engaging the flange of the bottom shell when the top shell is in its closed position to secure the top shell in its closed position.

14. The book of claim 10, wherein the plurality of pages are pivotably coupled to the bottom shell with a plurality of binder clips extending through a plurality of apertures formed in the plurality of pages.

15. The book of claim 10, wherein the first surfaces of the plurality of pages have stereographic imagery printed thereon so that a user can view the stereographic imagery through the lens system of the optical viewer.

16. The book of claim 10, wherein the case and the optical viewer are formed simultaneously by vacuum forming a plastic material.

17. The book of claim 10, wherein the coupling means is removable from the bottom shell to permit the plurality of pages to be removed from the bottom shell, rearranged, and reattached to the bottom shell.

18. A stereographic book comprising:
 a case including a bottom shell portion having a bottom surface, a front side wall, a rear side wall, the case also including a top shell formed integrally with the bottom shell coupled to the rear side wall of the bottom shell, the top shell being pivotable between a closed position and an open position, the top shell engaging the bottom shell when the top shell is in its closed position to provide an enclosed region between the top and bottom shells;
 an optical viewer formed integrally with the bottom shell adjacent and coupled to the front side wall, the optical viewer including a lens system having a predetermined focal length, the optical viewer being pivotable between a storage position aligned substantially parallel to the bottom surface of the bottom shell and an upright viewing position;
 a plurality of pages, each page including a first surface having stereographic imagery printed thereon, and including a second surface having textual information printed thereon; and
 means for pivotably coupling the plurality of pages to the bottom shell adjacent the rear side wall of the bottom shell spaced apart from the optical viewer by a predetermined distance substantially equal to the predetermined focal length of the lens system, each of the plurality of pages being pivotable relative to the bottom shell portion between an upright viewing position in which the first surface of the page is aligned to face the lenses of the optical viewer so that a user can view the stereographic imagery through the lens system of the optical viewer to visualize a three dimensional image and a second position in which the pages are aligned substantially parallel to the bottom surface of the bottom shell and nested within the bottom shell, the top shell being pivotable relative to the bottom shell to its closed position to enclose and protect the plurality of pages and the optical viewer in said enclosed region between the top and bottom shells when the plurality of pages are in the second reading position and the optical viewer is in its storage position.

19. The book of claim 18, wherein the bottom shell includes a flange formed around a top perimeter of the bottom shell and the top shell includes an outer lip and locking tabs formed on the outer lip for engaging the flange of the bottom shell when the top shell is in its closed position to secure the plastic case in its closed position.

20. The book of claim 18, wherein the case and the optical viewer are formed simultaneously by vacuum forming a plastic material.

* * * * *